(12) United States Patent
Maguire et al.

(10) Patent No.: US 7,244,148 B2
(45) Date of Patent: Jul. 17, 2007

(54) CIRCUIT DISCONNECT ASSEMBLY

(75) Inventors: Pax Maguire, Ann Arbor, MI (US); Venkateswa Sankaran, Farmington Hills, MI (US); Jacob Mathews, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/897,845

(22) Filed: Jul. 23, 2004

(65) Prior Publication Data

US 2006/0019541 A1   Jan. 26, 2006

(51) Int. Cl.
*H01R 13/68* (2006.01)
*H01R 33/95* (2006.01)

(52) U.S. Cl. ................................. 439/620.28

(58) Field of Classification Search ........... 439/621, 439/622, 620.26, 620.28
See application file for complete search history.

(56) References Cited

U.S. PATENT DOCUMENTS

| | | | |
|---|---|---|---|
| 945,017 A | 1/1910 | Cole | |
| 1,586,011 A * | 5/1926 | Sloane | 337/214 |
| 2,245,294 A * | 6/1941 | Pelissier | 337/268 |
| 3,480,898 A | 11/1969 | Giegerich | |
| 4,484,185 A * | 11/1984 | Graves | 340/656 |
| 4,762,509 A * | 8/1988 | Schaefer | 439/621 |
| 5,034,620 A | 7/1991 | Cameron | |
| 5,135,410 A * | 8/1992 | Kawase et al. | 439/372 |
| 5,336,934 A | 8/1994 | Toepfer et al. | |
| 5,389,462 A | 2/1995 | Lin | |
| 5,562,490 A | 10/1996 | Rybolt et al. | |
| 5,700,165 A | 12/1997 | Harris et al. | |
| 5,744,873 A | 4/1998 | Hasegawa et al. | |
| 5,751,208 A | 5/1998 | Martinez | |
| 5,816,850 A | 10/1998 | Yamada et al. | |
| 5,850,909 A * | 12/1998 | Wagner | 200/501 |
| 5,971,801 A | 10/1999 | Kato et al. | |
| 6,261,123 B1 * | 7/2001 | Kruger et al. | 439/511 |
| 6,491,534 B1 * | 12/2002 | Bonard et al. | 439/188 |
| 6,614,203 B2 | 9/2003 | Yuasa et al. | |
| 6,727,797 B1 | 4/2004 | Bruchmann | |
| 6,753,485 B1 * | 6/2004 | Tuniewicz | 200/11 R |
| 2002/0017405 A1 | 2/2002 | Nada | |
| 2003/0087542 A1 | 5/2003 | Yamakawa et al. | |
| 2006/0019541 A1 * | 1/2006 | Maguire et al. | 439/621 |

OTHER PUBLICATIONS

Patents Act 1977: Search Report under Section 17 dated Nov. 23, 2004 for Application No. GB0514454.8.

* cited by examiner

*Primary Examiner*—James R. Harvey
(74) *Attorney, Agent, or Firm*—Carlson, Gaskey & Olds

(57) ABSTRACT

A circuit disconnect assembly for a high-voltage electrical storage device in a vehicle integrates a grip portion and a fuse holder portion into one unit. The handle is easily manipulated manually within a housing of the storage device to open a high-voltage circuit and allow quick replacement of the fuse. The handle is manually shiftable between a locked state and an unlocked state to connect and disconnect the fuse from the circuit.

19 Claims, 4 Drawing Sheets

CIRCUIT DISCONNECT ASSEMBLY

TECHNICAL FIELD OF INVENTION

The present invention relates generally to electrical storage devices for vehicles, and more particularly to a service disconnect for a vehicle traction battery system.

BACKGROUND OF THE INVENTION

High-voltage electrical storage devices, such as high-voltage traction batteries, are used in electric, hybrid electric, and fuel cell vehicles. A high-voltage electrical circuit formed by the electrical storage device and a powertrain system connected to the storage device should be electrically isolated from the vehicle and the vehicle occupants at all times.

Traction batteries in today's electric and hybrid electric vehicles typically operate at voltages in excess of conventional accessory batteries. As such, service personnel require convenient and reliable techniques for opening the traction battery circuit and/or replacing fuses and other system components.

Currently known methods for opening a high-voltage electrical storage device and accessing the fuse tend to be cumbersome because they require multiple steps and components to remove the fuse. Therefore, there is a desire for a device that can reliably and expediently open the high-voltage circuit and allow replacement of a spent fuse in the high voltage circuit.

SUMMARY OF THE INVENTION

The invention is directed to a disconnect assembly that electrically isolates a high-voltage bus of an electrically-powered vehicle. The disconnect assembly is designed to hold a fuse in a high-voltage electrical storage device within an electrically isolated electrical circuit and to be easily manipulated to open the high-voltage circuit. At least one portion of the disconnect assembly is removable to allow quick replacement of the fuse. The disconnect assembly may be designed so that it must be removed before any other components in the high-voltage electrical storage device can be accessed.

In one embodiment, the disconnect assembly includes a handle designed to retain the fuse in the high-voltage circuit. The handle is manually shiftable within a housing in the electrical storage device between a locked position and a unlocked position to lock and unlock the fuse, thereby closing and opening the circuit. A handle body prevents any part of the assembly from being removed unless the handle is shifted to the unlocked position.

These and other features of the present invention can be best understood from the following specification and drawings, the following of which is a brief description.

DETAILED DESCRIPTION OF THE PREFERRED EMBODIMENT

Figure 1:
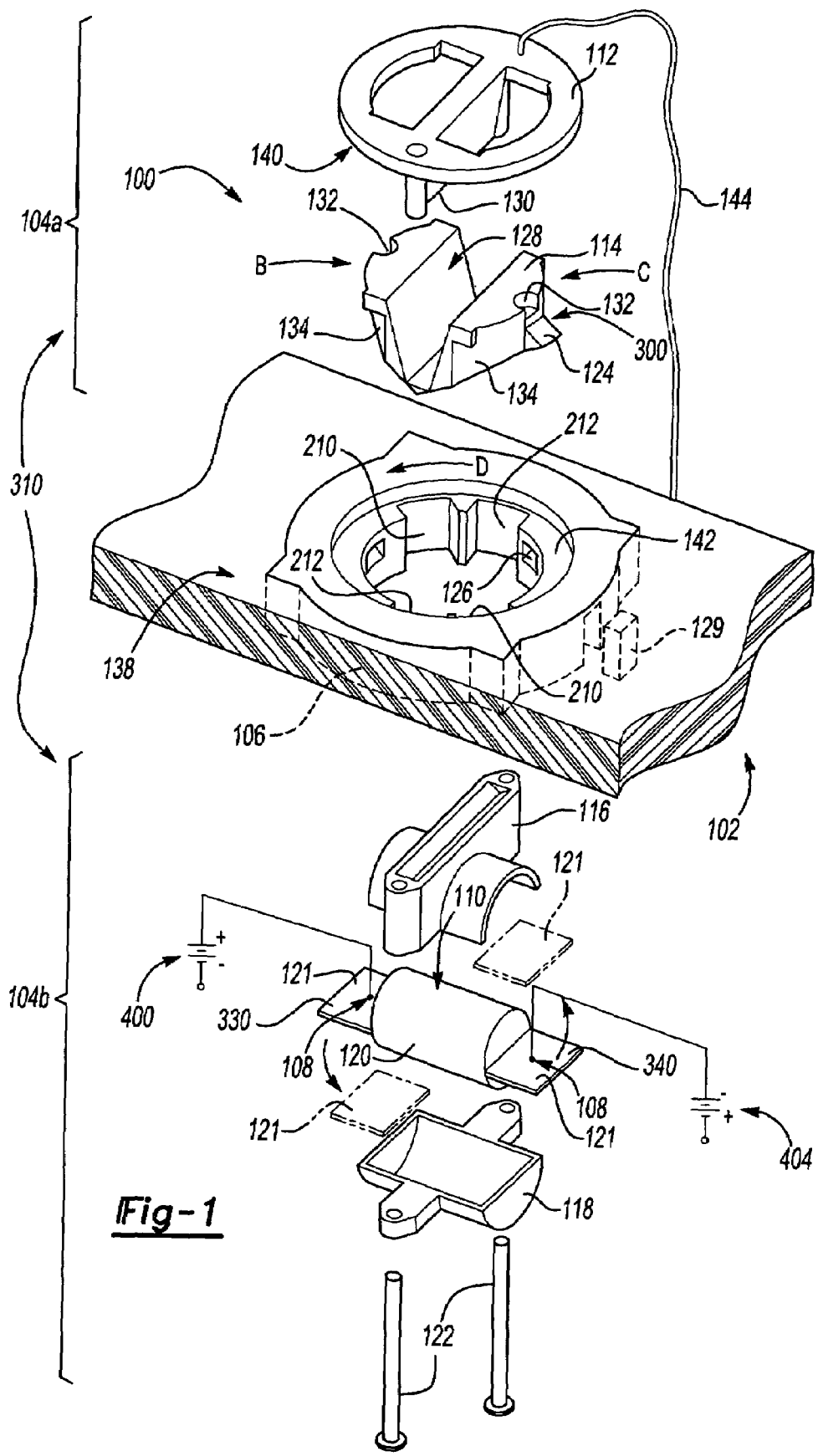
FIG. 1 is an exploded perspective view of an assembly according to one embodiment of the invention.

FIG. 1 is an exploded perspective view of a disconnect assembly 100 according to one embodiment of the invention. Generally, the disconnect assembly 100 is incorporated in a high-voltage electrical storage device 102 to quickly and reliably isolate high-voltage terminals in the device 102 from the rest of an electrical system, such as a high-voltage powertrain system (not shown) without removing a fuse from the device altogether in doing so. The disconnect assembly 100 also provides a convenient way to remove and service a spent fuse.

As shown in FIG. 1, the disconnect assembly 100 includes a handle that integrates an upper grip portion 104a and a lower fuse holder portion 104b together into a single unit. The handle 310 is designed to engage with a housing 106 disposed on the electrical storage device. The housing 106 is fixed to or integral with the electrical storage device 102 and does not move relative to the electrical storage device 102, nor can it be removed when the handle is removed. Mating terminals 108 (e.g., FIGS. 4A and 4B) separate a series connections of circuit segments, such as electrochemical cells or batteries 400, 404 (shown schematically), inside the electrical storage device 102. The mating terminals 108 include one positive terminal and one negative terminal that can be connected together by a fuse 110. In one embodiment, the mating terminals 108 divide the series connections into two halves, thereby cutting the voltage across the mating terminals 108 by half. This is preferable because it reduces the voltage to its lowest possible level when opening the circuit formed by the segments in only one location. The mating terminals 108 may be disposed in the housing 106 or in another structure in the electrical storage device 102.

The handle is designed to be retained securely in the housing 106 and hold a fuse 110 or other circuit connector in the fuse holder portion 104b. When the fuse 110 is connected to the mating terminals 108, current flows through the fuse 110 from the positive mating terminal to the negative mating terminal. If the current flowing through the fuse 110 reaches an excessively high level and/or flows for an excessive duration, the fuse 110 will burn open, opening the circuit and preventing further current flow between the mating terminals 108. Both the handle and the fuse 110 are serviceable items in the electrical storage device 102.

The grip portion 104a of the handle acts as a user interface to allow a worker to easily connect and disconnect the fuse 110 from the mating terminals 108. In one embodiment, the grip portion 104a and the fuse holder portion 104b can be shifted together via rotation or other movement into either a locked position, where the fuse 110 is connected to the mating terminals 108 so that the electrical storage device 102 is ready to operate, or a unlocked position, where the mating terminals 108 are open to prevent current flow and allow the high voltage powertrain and external portions of the electrical storage device 102 to be accessed. The grip portion 104a can be manually moved to and from either position without actually removing the handle or the fuse 110 from the housing 106. The examples described below illustrate various possible structures that allow engagement and removal of the handle, which includes both the grip portion 104a and the fuse holder portion 104b. Regardless of the specific structure, however, the handle should be designed to require application of moderate force (e.g., squeezing and/or pressing force) to disengage any detent in the handle and/or the housing 106 before it can be shifted free of the mating terminals 108 and, if needed, lifted out of the housing 106.

In the embodiment shown in FIG. 1, the grip portion 104a of the handle includes a handle body 112 and a retention feature 114. A fuse connector 116 couples the fuse 110 to the handle body 112 so that manual shifting of the handle body 112 will shift the fuse 110 as well. The fuse holder portion 104b of the handle includes a fuse retainer 118 that holds the fuse 110. As shown in FIG. 1, a body portion 120 of the fuse 110 is at least partially enclosed between the fuse connector 116 and the fuse retainer 118. Terminals 121, such as first fuse terminal 330 and second fuse terminal 340, in the fuse 110 remain exposed outside the fuse connector 116 and the fuse retainer 115 in the handle so that they can connect to the mating terminals 108. Fasteners 122, such as through bolts, extend through the fuse retainer 118, the fuse connector 116, and the handle body 112 to connect them together so that they move as one unit. Each of these handle components will be described in greater detail below.

Both the grip portion 104a and the fuse holder portion 104b of the handle may be made of any suitable electrically-insulating material, such as plastic. To prevent the grip portion 104a from shifting too freely in the housing 106 or otherwise disengaging from the housing 106, the retention feature 114 has a detent 300, such as tab 124, to hold the grip portion 104a and/or the fuse holder portion 104b in the housing 106. In the embodiment shown in FIG. 1, the retention feature 114 includes at least one tab 124 designed to engage with at least one corresponding recess 126 in the housing 106. The retention feature 114 in this case is made of a resilient material and has a V-shaped groove 128 that accommodates a substantially planar projection 130 on the handle body 112.

When a worker applies a squeezing or pinching force on opposing depressions 132 in the direction of arrow B and the direction of arrow C of the retention feature 114, side walls 134 of the retention feature 114 move inward toward each other. The inward movement of the side walls 134 disengages the tab 124 on the retention feature 114 from the recess 126 in the housing 106, freeing the retention feature 114 to shift in the direction of arrow D within the housing 106. The resiliency of the retention feature 114 causes the side walls 134 to move back outward when the tab 124 aligns with the recess 126 so that the tab 124 engages with the recess 126. Also, pulling upward on the handle body 112 when the tab 124 is not engaged with the recess 126 and when the fuse blades 121 are aligned with openings, such as a first set of ruse channels 210, in the housing 106 allows the grip portion 104a and the fuse holder portion 104b, therefore the fine 110 encased therein, to be lifted out of the electrical storage device 102 for service.

Figure 2:
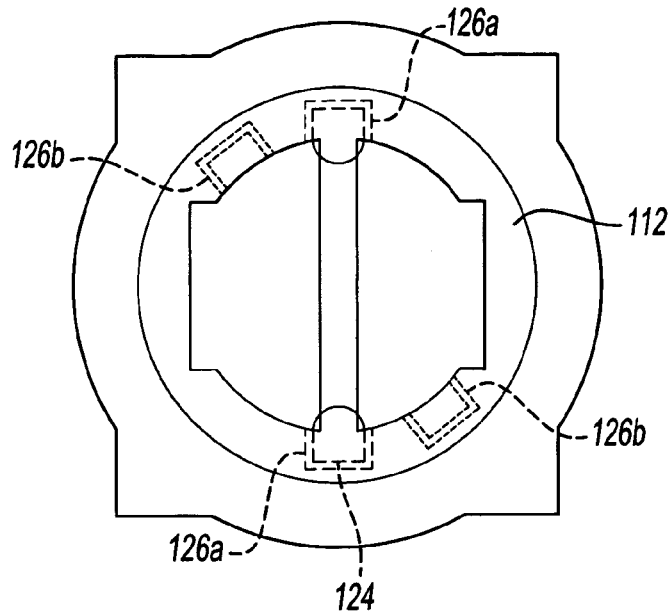
FIG. 2 illustrates one example of a top view of the assembly of FIG. 1.

As shown in FIG. 2, the retention feature 114 may have several tabs 124 opposite each other, and the housing 106 may have several pairs of corresponding recesses 126a, 126b. The tabs 124 engage a first set of recesses 126a when the handle (i.e., the grip portion 104a and the fuse holder portion 104b) and the fuse 110 are in the locked position and engage a second set of recesses 126b when the handle and the fuse 110 are in the unlocked position. The engagement between the tabs 124 and the recesses 126a, 126b prevent the grip portion 104a of the handle from shifting once it is placed in a designed position. Of course, it is possible to place the tabs on the housing and the recesses on the retention feature without departing from the scope of the invention.

A limit switch 129 may also be incorporated in the housing 106 near the recesses 126a, 126b and in communication with a processor (not shown). The tab 124 is configured so that it closes the limit switch 129 when it engages with one of the recesses 126a, 126b, allowing vehicle electronics to detect the position of the handle and the fuse 110 and confirm that it is inserted correctly in a selected position. The limit switch 129 may also act as a positive override of any system failure (e.g., failed software, electrical and/or mechanical systems) during storage and shipment of a damaged electrical storage device.

The engagement between the grip portion 104a of the handle and the housing 106 of the electrical storage device 102 can prevent an access cover 138 of the electrical storage device 102 from being removed unless the handle is removed first. In one embodiment, the retention feature 114 is held between a flange 140 on the handle and a flat portion 142 of the housing 106 when the handle is in the unlocked position and the locked position. Also, the fuse blades 121 are held securely between the mating terminals 108 to prevent the fuse 110 from being lifted out of the housing 106 from the locked position. As a result, the access cover 138 cannot be removed while the handle is connected to the housing 106.

The disconnect assembly 100 may be designed with a stowage feature so that the handle can be easily stowed in the service position to prevent it from becoming damaged or lost during service. For example, a tether 144 may be attached to the grip portion 104a and the housing 106. Alternatively, a second set of fuse channels 212 in the housing 106 may be included to allow the grip portion 104a and the fuse holder portion 104b of the handle to be inserted in a service position. The shape of the handle acts as the stowage feature in this case. In the service position, the fuse 110 is completely isolated from the mating terminals 108 and the grip portion 104a (and therefore the fuse 110) is not directly shiftable to either the unlocked or locked position. To move the handle back to the unlocked position so that is shiftable to the locked position, the fuse blades 121 are aligned with the second set of fuse channels 212 so that the handle can be completely removed from the housing 106 out of the service position. The fuse blades 121 are then aligned with the first set of fuse channels 210 and the handle is reinserted into the housing 106 in the unlocked position.

Figure 3A:
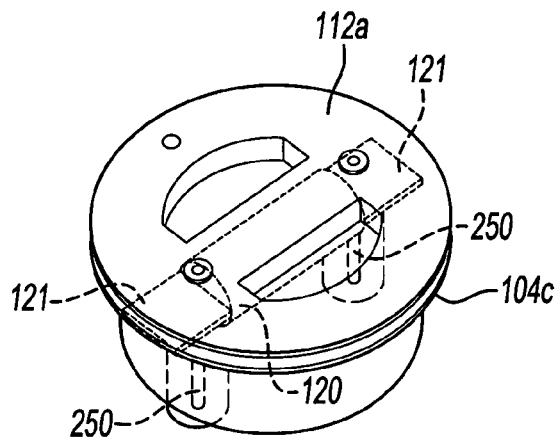
FIGS. 3A and 3B are a perspective view and a bottom plan view, respectively, of the assembly according to another embodiment of the invention.
Figure 3A:
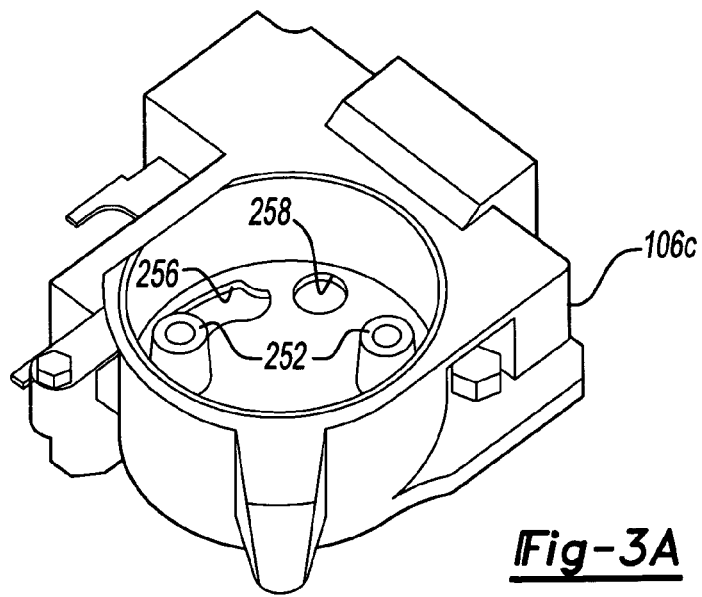
Figure 3B:
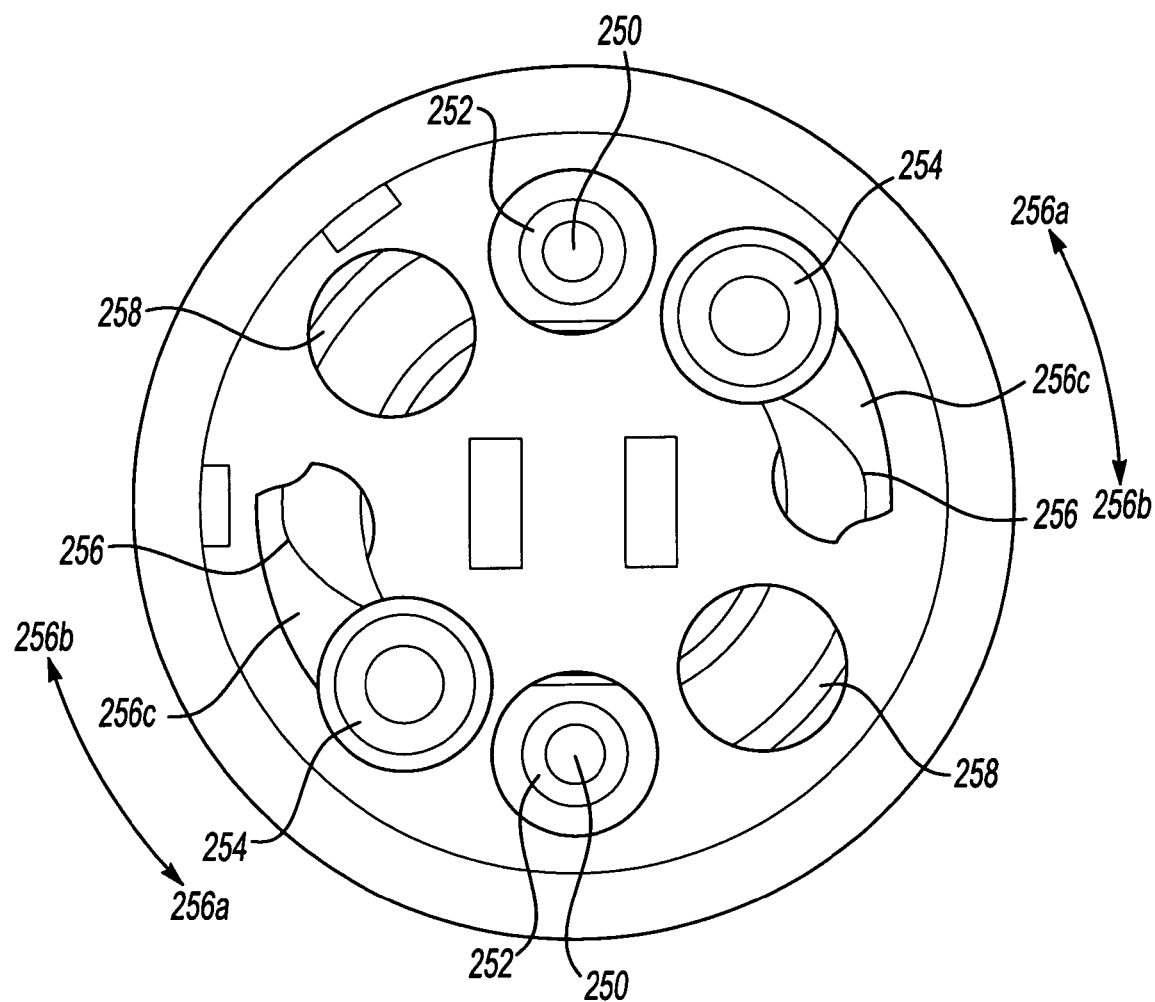

FIGS. 3A and 3B illustrate the disconnect assembly 100 according to another embodiment of the invention. FIG. 3A is a perspective view of an alternative handle 104c that is separated from an alternative housing 106c. For simplicity, the handle 104c in this embodiment collectively refers to the combined unit having the grip portion and the fuse holder. FIG. 3B is a bottom plan view (i.e., a view taken from inside the electrical storage device 102 looking upward into the housing 106c) when the handle 104c is placed inside the housing 106c and left into the unlocked position. In this embodiment, two high voltage pins 250 are connected to the fuse blades 121. When the handle 104c is inserted into the housing 106c in the unlocked position, the pins 250 engage with corresponding holes 252 in the housing 106c to form the high voltage connection. The high voltage connection itself can be, for example, a resilient connection structure made by Anphenol(R).

The handle 104c in this embodiment also includes a pair of retainers 254, such as T-shaped retainers, designed to engage with corresponding first openings 256 and second openings 258 in the housing. Like the previous embodiment, the handle body 112 of the handle 104c can be manually shifted. The retainers 254 act as the retention feature and each have a neck (not shown) so that the retainers 254 can be held securely in at least one of the openings 256, 258.

In the illustrated embodiment, each of the first openings 256 has an elongated shape so that the retainers 254 can be shifted via rotation between a first portion corresponding to the unlocked position 256a and a second portion corresponding to the locked position 256b. The second portion 256b may be smaller than the rest of the first opening 256 so that the first opening 256 securely holds the neck of each retainer 254 while the handle 104c is shifted, preventing the handle 104c from being lifted out of the housing 106c from any position other than the unlocked position during shifting. The retainers 254 may also be resiliently biased so that shifting can occur only after enough force has been applied to overcome the biasing force before the handle 104c shifts; thus, the retainers 254 in this case also act as the detent.

The second openings 258 correspond to the service position. As shown in FIGS. 3A and 3B, the second openings 258 are completely separate from the first openings 256, making it impossible for the handle 104c to be shifted from the second openings 258 to the first openings 256 without first removing the handle 104c from the housing 106c. Also, the pins 250 are disengaged from the holes 252 when the handle 104c is in the service position and are simply suspended freely from the fuse blades 121. Thus, the handle 104c must be lifted out of the housing 106c before the handle 104c can be placed into or out of the service position. As a result, when the electrical storage device 102 is shipped or serviced, the retainers 254 engage with the second openings 258 without any danger of inadvertently slipping into the first openings 256.

Figure 4A:
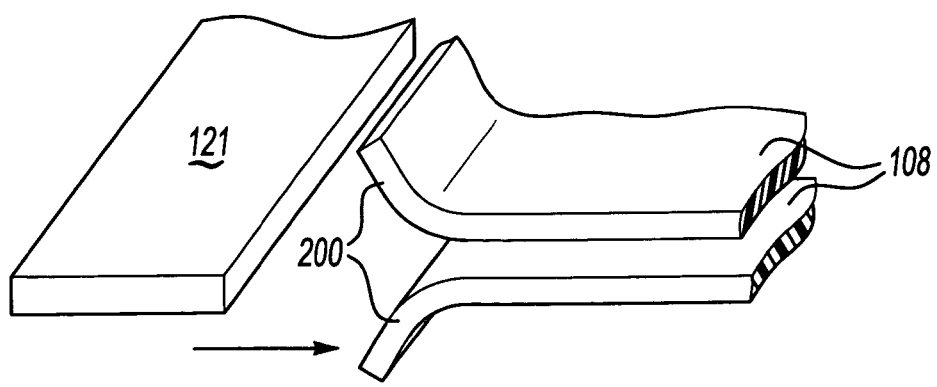
FIGS. 4A and 4B are schematic section views of a relationship between a fuse and mating terminals.
Figure 4B:
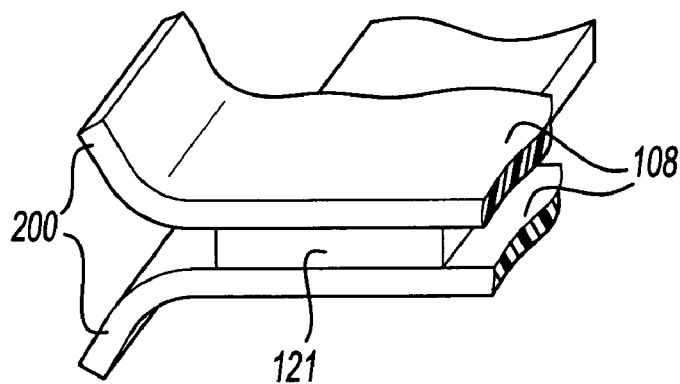

FIGS. 4A and 4B illustrate one possible relationship between the mating terminals 108 and the fuse terminals 121. FIG. 4A shows the fuse 110 in the unlocked position and FIG. 4B shows the fuse 110 in the locked position. As noted above, the mating terminals 108 include a positive terminal and a negative terminal and separate the series connections of electrochemical cells in the electrical storage device 102 into two halves that can be connected only by inserting the fuse 110 in the locked position. Dividing the series connection in half reduces the electrical potential inside the electrical storage device 102 by half when the fuse 110 is unlocked for service.

The mating terminals 108 are generally planar and arranged in a spaced relationship to form an open circuit. The mating terminals 108 may each have a bent portion 200 at one end to guide the fuse terminals 121 into a locked position. As shown in FIG. 4A, shifting the handle shifts the fuse terminals 121 toward the mating terminals 108. Once the handle and the fuse 110 are in the locked position (FIG. 4B), the mating terminals 108 are linked by the fuse terminal 121, allowing current to pass from the positive mating terminal to the negative mating terminal.

In one embodiment, the fuse terminals 121 reach the locked position only after they are positioned securely between the mating terminals 108; in other words, the locked position require more than just mere contact between the mating terminals 108 and the fuse terminals 121. This ensures that vibrations or other typical vehicle forces do not disconnect the fuse 110 unexpectedly. Moreover, it is impossible to remove the fuse 110 from the housing 106 while it is in the locked position because the fuse terminals 121 are sandwiched between the planar mating terminals 108, which prevent vertical displacement of the fuse 110. Thus, the fuse 110 can be easily removed and serviced while keeping the rest of the electrical storage device 102 intact.

Figure 5A:
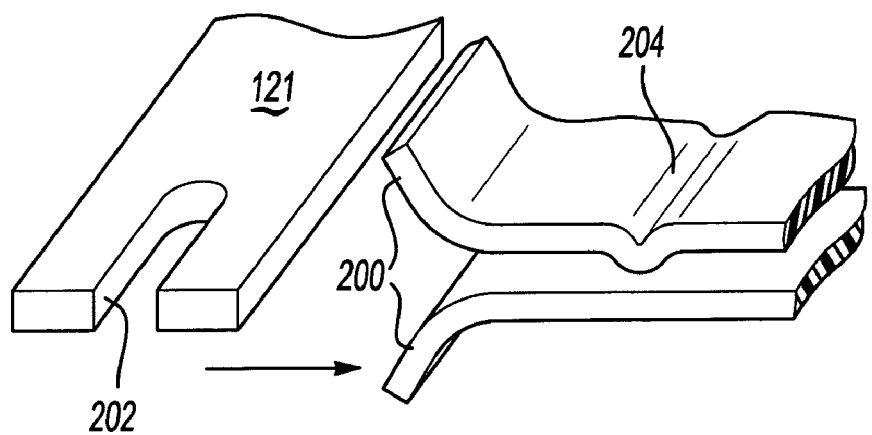
FIGS. 5A and 5B are schematic section views of another relationship between the fuse and mating terminals.
Figure 5B:
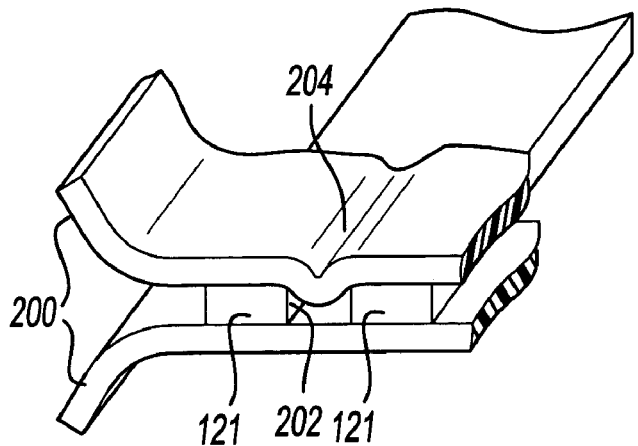

FIGS. 5A and 5B illustrate a variation of the structure shown in FIGS. 4A and 4B. In this example, the fuse terminals 121 have a notch 202 that engages with an bump 204 formed in at least one of the mating terminals 108. The relative dimensions between the bump 204 and the fuse terminals 121 are selected so that the notch 202 engages with the bump 204 without requiring excessive force. The engagement between the bump 204 and the notch 202 provides an added measure of security in the connection between the mating terminals 108 and the fuse terminals 121.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An electrical storage device assembly for a vehicle, comprising:
   a housing disposed on a vehicular electrical storage device;
   a grip portion that is manually shiftable within the housing between a locked position and an unlocked position; and
   a fuse holder portion integrated with the grip portion, wherein the fuse holder portion is adapted to operably connect a fuse to the grip portion such that shifting of the grip portion shifts the fuse between the locked position and the unlocked position, the fuse in communication with the vehicular electrical storage device in the locked position.

2. The assembly of claim 1, wherein the grip portion and the fuse holder portion are shiftable via rotation.

3. The assembly of claim 1, wherein the fuse holder portion includes a fuse retainer that at least partially encloses the fuse.

4. The assembly of claim 1, wherein the grip portion includes a retention feature, the retention feature preventing shifting of the fuse portion to at least one of the locked position and the unlocked position until a predetermined force is applied to the retention feature in a direction different from a direction of shifting.

5. The assembly of claim 4, wherein the retention feature prevents shifting from both the locked position and the unlocked position until the predetermined force is applied to the retention feature.

6. The assembly of claim 4, wherein the retention feature has one of a protrusion and a hole to receive the protrusion and the housing has the other of the protrusion and the hole, the protrusion preventing shifting of the fuse portion in the housing when in the hole.

7. The assembly of claim 1, wherein the grip portion and the fuse holder portion are removable from the housing.

8. The assembly of claim 7, further comprising a stowage feature engaging the grip portion to the housing when the fuse portion is no longer in communication with the vehicle electrical storage device, the stowage feature precluding shifting of the fuse portion into at least one of the locked position and the unlocked position when the grip portion is at least partially disposed in the housing.

9. The assembly of claim 7, wherein the housing has a profile to accommodate the grip portion in the housing in a service position that blocks the grip portion from shifting within the housing from the service position to the unlocked position and the locked position.

10. An electrical storage device assembly for a vehicle, comprising:
- an electrical storage device housing;
- a positive mating terminal spaced from a negative mating terminal, the positive mating terminal and the negative mating terminal in communication with the electrical storage device; and
- a handle having a grip portion and a fuse holder portion, the grip portion manually shiftable within the electrical storage device housing between a locked position and an unlocked position, the fuse holder portion integrated with the grip portion, wherein the fuse holder portion is adapted to operably connect a fuse to the grip portion such that shifting of the grip portion shifts the fuse between the locked position, in which the fuse connects the positive mating terminal and the negative mating terminal to form a closed circuit with the electrical storage device and the unlocked position, in which the fuse disconnects the positive mating terminal from the negative mating terminal to form an open circuit with the electrical storage device.

11. The device of claim 10, wherein the electrical storage device comprises a plurality of batteries, wherein the plurality of batteries are divided between the positive mating terminal and the negative mating terminal into two portions, and wherein the handle connects and disconnects the two portions.

12. The device of claim 10, wherein the fuse has a first fuse terminal and a second fuse terminal, the positive mating terminal and the negative mating terminal both contacting the first fuse terminal when the fuse is in the locked position.

13. The device of claim 10, wherein the grip portion has one of a protrusion and a hole to receive the protrusion and the electrical storage device housing has the other of the protrusion and the hole, the hole and protrusion preventing shifting from at least one of the locked position and the unlocked position.

14. The device of claim 10, further comprising a detent in at least one of the electrical storage device housing and the handle to engage the handle with the electrical storage device housing in at least one of the unlocked position and the locked position, wherein the detent disengages when a force is applied to the handle in a direction different from a direction of shifting of the handle.

15. The device of claim 10, including a limit switch to detect when the handle is engaged in the electrical storage device housing.

16. The device of claim 10, wherein the handle is removable from the housing.

17. The device of claim 10, further comprising a stowage feature for storing the handle, the stowage feature preventing shifting of the handle into at least one of the unlocked position and the locked position.

18. The assembly of claim 1, wherein the housing is disposed on an access cover of the vehicular electrical storage device, the grip portion at least partially securing the access cover to the vehicular electrical storage device.

19. The assembly of claim 10, wherein the electrical storage device housing includes an access cover, the handle at least partially securing the access cover to the electrical storage device.

* * * * *